(12) United States Patent
Mutsuo

(10) Patent No.: US 10,375,261 B2
(45) Date of Patent: Aug. 6, 2019

(54) IMAGE SCANNING APPARATUS

(71) Applicant: KYOCERA Document Solutions Inc., Osaka (JP)

(72) Inventor: Toshiaki Mutsuo, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/823,087

(22) Filed: Nov. 27, 2017

(65) Prior Publication Data

US 2018/0159997 A1 Jun. 7, 2018

(30) Foreign Application Priority Data

Dec. 2, 2016 (JP) ................. 2016-234737

(51) Int. Cl.
*H04N 1/00* (2006.01)
*H04N 1/04* (2006.01)

(52) U.S. Cl.
CPC ........... *H04N 1/00742* (2013.01); *H04N 1/04* (2013.01); *H04N 2201/0081* (2013.01)

(58) Field of Classification Search
CPC ....... H04N 1/00803; H04N 2201/0081; H04N 1/00588; H04N 1/00708; H04N 1/0071; H04N 1/00713; H04N 1/00718; H04N 1/00774; H04N 1/00809; H04N 1/00816; H04N 1/233; H04N 1/38; H04N 1/3877; H04N 2201/0094; H04N 1/00742; H04N 1/04

USPC .................................................. 358/406, 462
See application file for complete search history.

(56) References Cited

U.S. PATENT DOCUMENTS

| | | | |
|---|---|---|---|
| 8,634,114 B2 * | 1/2014 | Mori ........................ | H04N 1/46 358/448 |
| 2011/0116112 A1 * | 5/2011 | Muramatsu ........... | G06T 3/4053 358/1.9 |
| 2014/0177958 A1 * | 6/2014 | Mutsuo ................... | G06T 9/007 382/166 |

(Continued)

FOREIGN PATENT DOCUMENTS

JP 2014-146981 8/2014

*Primary Examiner* — Negussie Worku

(57) ABSTRACT

In an input image generated as a binary image from a scanned document image, a projection image generating unit (a) tries at each primary-scanning-directional target pixel position to detect a secondary-scanning-directional run along a secondary scanning direction, projects the detected secondary-scanning-directional run at the primary-scanning-directional target pixel position and thereby generates a one-dimensional primary-scanning-directional-projection image, and (b) tries at each secondary-scanning-directional target pixel position to detect a primary-scanning-directional run along the primary scanning direction, projects the detected primary-scanning-directional run at the secondary-scanning-directional target pixel position and thereby generates a one-dimensional secondary-scanning-directional-projection image. A blank sheet determining unit determines that the document is a blank document at least on the basis of the number of runs in the primary-scanning-directional-projection image and the number of runs in the secondary-scanning-directional-projection image.

5 Claims, 7 Drawing Sheets

(56) References Cited

U.S. PATENT DOCUMENTS

| | | | |
|---|---|---|---|
| 2015/0156358 A1* | 6/2015 | Yabuuchi | H04N 1/00803 |
| | | | 358/462 |
| 2015/0181064 A1* | 6/2015 | Yabuuchi | H04N 1/00803 |
| | | | 358/406 |
| 2015/0312436 A1* | 10/2015 | Mutsuo | H04N 1/04 |
| | | | 358/475 |
| 2016/0286096 A1* | 9/2016 | Satomi | H04N 19/132 |
| 2017/0032227 A1* | 2/2017 | Nanbu | G06K 9/00449 |
| 2017/0064140 A1* | 3/2017 | Mutsuo | H04N 1/4052 |
| 2017/0302820 A1* | 10/2017 | Mutsuo | H04N 1/00806 |
| 2018/0236768 A1* | 8/2018 | Tanaka | B41J 2/165 |
| 2018/0334348 A1* | 11/2018 | Mashimo | B65H 29/20 |
| 2019/0068821 A1* | 2/2019 | Mutsuo | H04N 1/0408 |

* cited by examiner

IMAGE SCANNING APPARATUS

CROSS-REFERENCE TO RELATED APPLICATIONS

This application relates to and claims priority rights from Japanese Patent Application No. 2016-234737, filed on Dec. 2, 2016, the entire disclosures of which are hereby incorporated by reference herein.

BACKGROUND

1. Field of the Present Disclosure

The present disclosure relates to an image scanning apparatus.

2. Description of the Related Art

An image scanning apparatus detects a non-white line in a primary scanning direction and a non-white line in a secondary scanning direction, and performs blank sheet determination excluding a ruled line on the basis of the number of continuous non-white lines in the primary scanning direction and the number of continuous non-white lines in the secondary scanning direction. For example, a ruled line originally printed in a notebook is a thin line in parallel with the primary scanning direction or the secondary scanning direction, and therefore, if the aforementioned number of the continuous non-white lines is small, it is possible to determine that the non-white lines are a ruled line. As mentioned, this image scanning apparatus is capable of determining whether an object (character or the like) other than a ruled line exists in an input image or not.

However, even if a ruled line in a document is a thin line in parallel with a horizontal direction or a vertical direction, due to skew motion in image scanning or the like, a ruled line slants to the primary scanning direction or the secondary scanning direction in an input image. In such a case, since the ruled line slants, in the aforementioned image scanning apparatus, the number of continuous non-white lines corresponding to the slanting ruled line gets large, and consequently, it is sometimes difficult to determine whether another object (character or the like) exists or not with excluding the ruled line.

SUMMARY

An image scanning apparatus according to an aspect of the present disclosure includes an image scanning unit, a preprocessing unit, a projection image generating unit, and a blank sheet determining unit. The image scanning unit is configured to optically scan a document image of a document. The preprocessing unit is configured to generate an input image as a binary image from the document image. The projection image generating unit is configured to (a) try at each primary-scanning-directional target pixel position in the input image to detect a secondary-scanning-directional run that includes a predetermined number of continuous pixels or more along a secondary scanning direction, project the detected secondary-scanning-directional run at the primary-scanning-directional target pixel position and thereby generate a one-dimensional primary-scanning-directional-projection image, and (b) try at each secondary-scanning-directional target pixel position in the input image to detect a primary-scanning-directional run that includes a predetermined number of continuous pixels or more along the primary scanning direction, project the detected primary-scanning-directional run at the secondary-scanning-directional target pixel position and thereby generate a one-dimensional secondary-scanning-directional-projection image. The blank sheet determining unit is configured to determine that the document is a blank document at least on the basis of the number of runs in the primary-scanning-directional-projection image and the number of runs in the secondary-scanning-directional-projection image.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
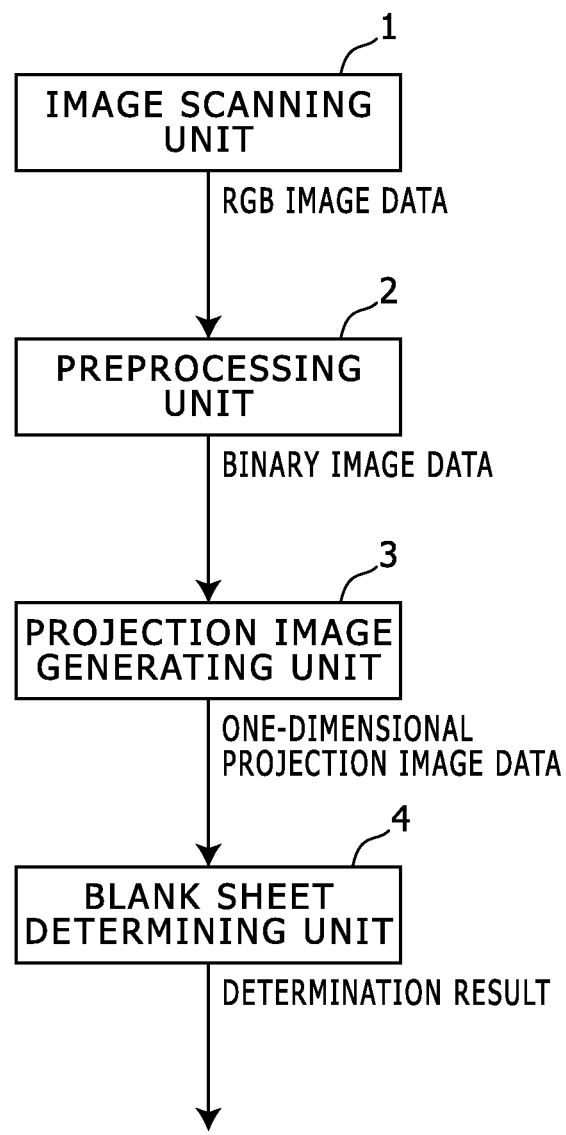
FIG. 1 shows a block diagram which indicates a configuration of an image scanning apparatus according to an embodiment of the present disclosure.

FIG. 1 shows a block diagram which indicates a configuration of an image scanning apparatus according to an embodiment of the present disclosure. The image scanning apparatus shown in FIG. 1 includes an image scanning unit 1, a preprocessing unit 2, a projection image generating unit 3, and a blank sheet determining unit 4.

The image scanning unit 1 optically scans a document image of a document put on a platen glass or transported by an automatic document feeder, and thereby generates image data of the document image. This image data is color image data, here RGB data, but may be CMY data. Further, this image data may be (grayscale or binary) monochrome image data.

The preprocessing unit 2 generates as an input image a binary image of the document image. For example, if color image data is outputted from the image scanning unit 1, a luminance image is at first generated by removing color components in the document image and the input image is generated by inverting pixel values of the luminance image (e.g. the pixel value x is inverted to (255-x) in case of an 8-bit pixel value) and binarizing the inverted pixel values. For example, if grayscale monochrome image data is outputted from the image scanning unit 1, the input image is generated by binarizing a grayscale monochrome image based on this image data. For example, if binary monochrome image data is outputted from the image scanning unit 1, a binary image based on this image data is used as the input image.

The projection image generating unit 3 (a) tries at each primary-scanning-directional target pixel position in the input image to detect a secondary-scanning-directional run that includes a predetermined number of continuous pixels or more along a secondary scanning direction, projects the detected secondary-scanning-directional run at the primary-scanning-directional target pixel position and thereby generates a one-dimensional primary-scanning-directional-projection image (i.e. one-dimensional image along the secondary scanning direction), and (b) tries at each secondary-scanning-directional target pixel position in the input image to detect a primary-scanning-directional run that includes a predetermined number of continuous pixels or more along the primary scanning direction, projects the detected primary-scanning-directional run at the secondary-scanning-directional target pixel position and thereby generates a one-dimensional secondary-scanning-directional-projection image (i.e. one-dimensional image along the primary scanning direction).

Here this "predetermined number of pixels" is set as an uppermost value of a thickness (the number of pixel) of a ruled line in the document.

The generation of the primary-scanning-directional-projection image and the generation of the secondary-scanning-directional-projection image may be performed sequentially or performed parallelly. If the generation of the primary-scanning-directional-projection image and the generation of the secondary-scanning-directional-projection image may be performed sequentially, then whichever can be performed at first.

The blank sheet determining unit 4 determines that the document is a blank document at least on the basis of the number of runs (equal to or larger than zero) in the primary-scanning-directional-projection image and the number of runs (equal to or larger than zero) in the secondary-scanning-directional-projection image.

In Embodiment 1, the blank sheet determining unit 4 (a) determines that document is a blank document that includes a horizontal ruled line if the primary-scanning-directional-projection image includes no runs (i.e. projected runs) but the secondary-scanning-directional-projection image includes a run, and (b) determines that document is a blank document that includes a vertical ruled line if the secondary-scanning-directional-projection image includes no runs but the primary-scanning-directional-projection image includes a run. It should be noted that plural projected runs that overlaps one with another partially or totally are considered as one run.

Further, in Embodiment 1, the blank sheet determining unit may (a) determine that document is a blank document that includes a horizontal ruled line if the primary-scanning-directional-projection image does not include a predetermined number of runs nor more but the secondary-scanning-directional-projection image includes the predetermined number of runs or more, and (b) determine that document is a blank document that includes a vertical ruled line if the secondary-scanning-directional-projection image does not include the predetermined number of runs nor more but the primary-scanning-directional-projection image includes the predetermined number of runs or more. Here the "predetermined number" is equal to or larger than 1, and specified on the basis of setting data.

For example, a small number of the primary-scanning-directional-projection image and/or a small number of the primary-scanning-directional-projection image may be generated due to dust, a stain or the like even if the document includes no objects except for a ruled line. Even in such a case, it is properly determined that the document is a blank document.

It should be noted that the preprocessing unit 2, the projection image generating unit 3, and the blank sheet determining unit 4 are, for example, embodied by executing a program with a computer that includes a CPU (Central Processing Unit), a ROM (Read Only Memory), a RAM (Random Access Memory) and the like or embodied with an ASIC (Application Specific Integrated Circuit).

Figure 2:
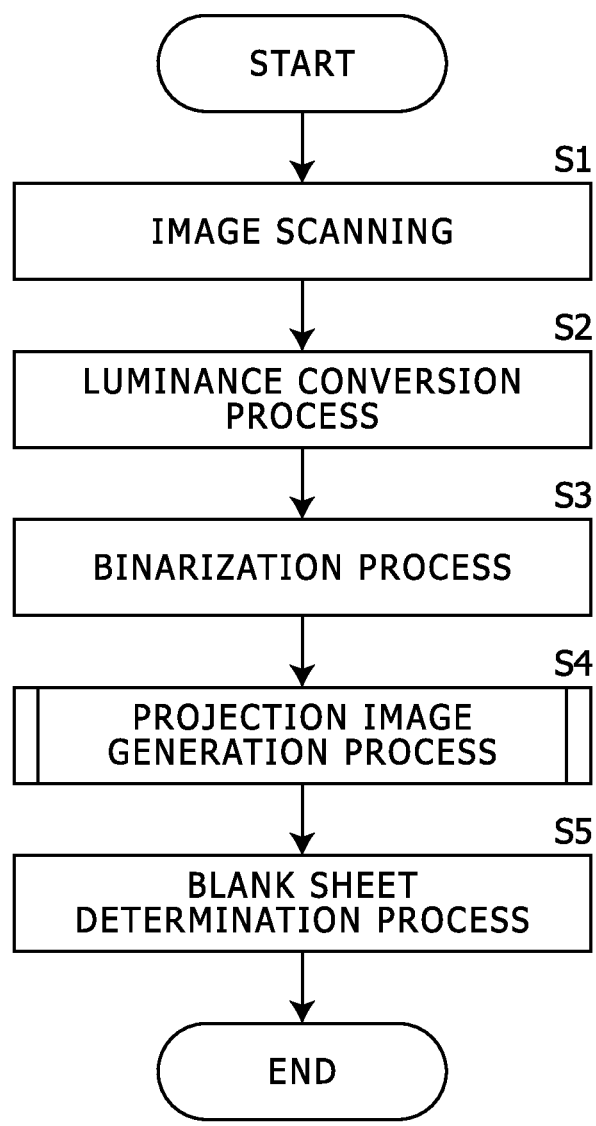
FIG. 2 shows a flowchart that explains a behavior of the image scanning apparatus shown in FIG. 1.

The following part explains a behavior of the aforementioned image scanning apparatus. FIG. 2 shows a flowchart that explains a behavior of the image scanning apparatus shown in FIG. 1.

Firstly, the image scanning unit 1 optically scans a document image of a document put on a platen glass or transported by an automatic document feeder, and outputs image data (here, RGB image data) of the document image to the preprocessing unit 2 (in Step S1). Here, if the document includes a horizontal ruled line or a vertical ruled line, even though the horizontal ruled line or the vertical ruled line is in parallel with a side of the document sheet in the document, an image of the ruled line may slant in the document image.

The preprocessing unit 2 converts an RGB color image based on the image data to a luminance image (in Step S2), and converts the luminance image to a binary image (in Step S3).

Subsequently, the projection image generating unit 3 performs the generation of the one-dimensional primary-scanning-directional-projection image and the one-dimensional secondary-scanning-directional-projection image (in Step S4).

Figure 3:
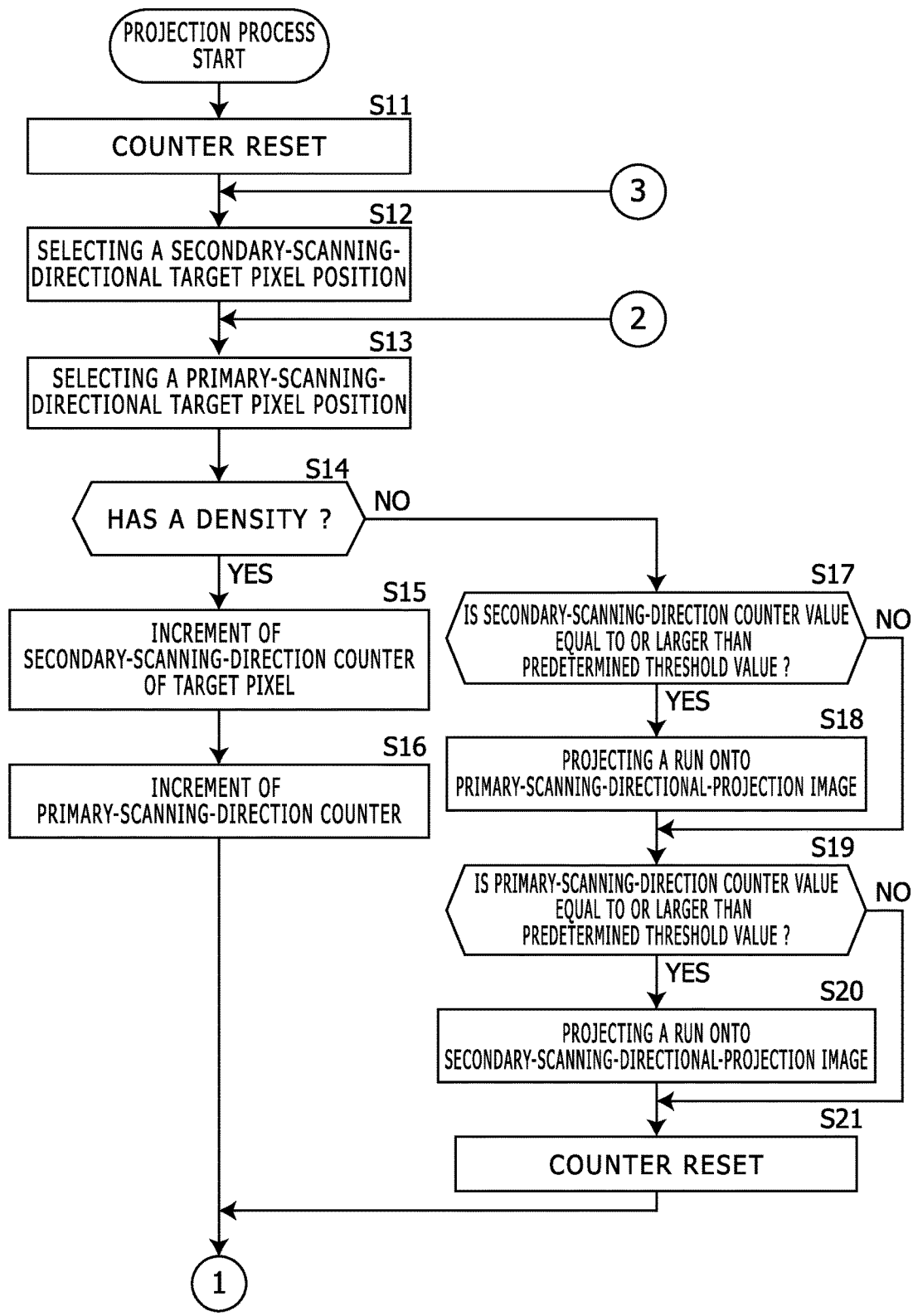
FIG. 3 shows a flowchart that explains an example of a projection image generation process (in Step S4) in FIG. 2 (1/2)
Figure 4:
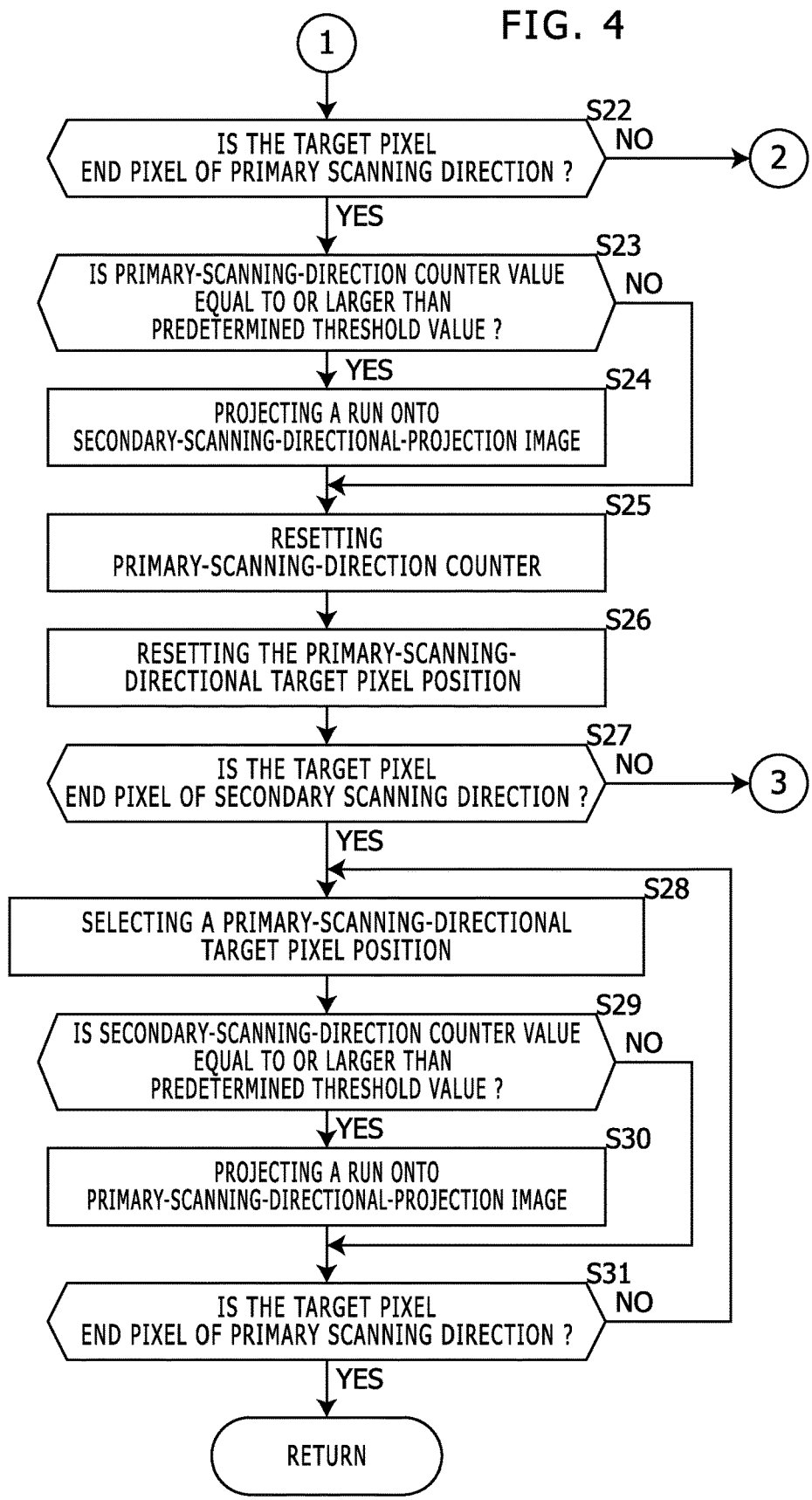
FIG. 4 shows a flowchart that explains an example of a projection image generation process (in Step S4) in FIG. 2 (2/2)

Here an example of this projection image generation process (in Step S4) is explained. FIGS. 3 and 4 show flowcharts that explains an example of a projection image generation process. In the example shown in FIGS. 3 and 4, the primary-scanning-directional-projection image and the secondary-scanning-directional-projection image are generated while scanning pixel values once in input image. Alternatively, the primary-scanning-directional-projection image and the secondary-scanning-directional-projection image may be separately generated while scanning pixel values twice in input image.

The projection image generating unit 3 sets one primary-scanning-direction counter and secondary-scanning-direction counter s of which the number is the same as the number of pixels (i.e. the width) of the input image in the primary scanning direction, and resets the values of the counters to zero (in Step S11).

The primary-scanning-direction counter is a counter that counts continuous pixels having a density along the primary scanning direction (i.e. the number of pixels in a run) at a secondary-scanning-directional target pixel position Ps. The secondary-scanning-direction counters are assigned to respective pixel positions in the primary scanning direction, and a secondary-scanning-direction counter assigned to a pixel position in the primary scanning direction is a counter that counts continuous pixels having a density along the secondary scanning direction (i.e. the number of pixels in a run) at this pixel position in the secondary scanning direction.

Further, the projection image generating unit 3 selects a secondary-scanning-directional target pixel position in order along the secondary scanning direction from the top (in Step S12), and selects a primary-scanning-directional target pixel position in order along the primary scanning direction from the top (in Step S13)

Subsequently, the projection image generating unit 3 identifies a pixel at the current primary-scanning-directional target pixel position and the current secondary-scanning-directional target pixel position as a target pixel, and determines whether the target pixel of the input image is a pixel having a density or not (in Step S14).

If the target pixel of the input image is a pixel having a density, then the projection image generating unit increases a value of the secondary-scanning-direction counter corresponding to the current primary-scanning-directional target pixel position by 1 (in Step S15), and also increases a value of the primary-scanning-direction counter by 1 (in Step S16).

Otherwise, if the target pixel of the input image is not a pixel having a density, then the projection image generating unit 3 firstly determines whether the value Cs of the secondary-scanning-direction counter corresponding to the primary-scanning-directional target pixel position is equal to or larger than a predetermined threshold value Th or not (in Step S17). If the value Cs of the secondary-scanning-direction counter is equal to or larger than a predetermined threshold value Th, then the projection image generating unit 3 projects a run onto the primary-scanning-directional-projection image (in Step S18). Specifically, in this process, in the primary-scanning-directional-projection image, the projection image generating unit 3 sets pixel values in a section from the pixel position (Ps−1) previous to the current secondary-scanning-directional target pixel position Ps to the pixel position (Ps−Cs) as a value corresponding to "a pixel having a density" (e.g. 1). The primary-scanning-directional-projection image is a one-dimensional binary image, and here an initial value of each pixel in primary-scanning-directional-projection image is set as a value corresponding to "a pixel not having a density" (e.g. 0).

Therefore, if the target pixel is a pixel not having a density and the value Cs of the secondary-scanning-direction counter is not zero, then it is considered that an end of a secondary-scanning-directional run is detected, and this run is projected if the length of this run is equal to or larger than the predetermined number of pixels (i.e. the threshold value Th). Here, even if the target pixel is a pixel not having a density, but if the value Cs of the secondary-scanning-direction counter is less than Th, then the run is not projected.

If the target pixel of the input image is not a pixel having a density, then the projection image generating unit 3 further determines whether the value Cp of the primary-scanning-direction counter is equal to or larger than the predetermined threshold value Th or not (in Step S19). If the value Cp of the primary-scanning-direction counter is equal to or larger than the predetermined threshold value Th, then the projection image generating unit 3 projects a run onto the secondary-scanning-directional-projection image (in Step S20). Specifically, in this process, in the secondary-scanning-directional-projection image, the projection image generating unit 3 sets pixel values in a section from the pixel position (Pp−1) previous to the current primary-scanning-directional target pixel position Pp to the pixel position (Pp−Cp) as a value corresponding to "a pixel having a density" (e.g. 1). The secondary-scanning-directional-projection image is a one-dimensional binary image, and here an initial value of each pixel in secondary-scanning-directional-projection image is set as a value corresponding to "a pixel not having a density" (e.g. 0).

Therefore, if the target pixel is a pixel not having a density and the value Cp of the primary-scanning-direction counter is not zero, then it is considered that an end of a primary-scanning-directional run is detected, and this run is projected if the length of this run is equal to or larger than the predetermined number of pixels (i.e. the threshold value Th). Here, even if the target pixel is a pixel not having a density, but if the value Cp of the primary-scanning-direction counter is less than Th, then the run is not projected.

Subsequently, the projection image generating unit 3 resets the value Cp of the primary-scanning-direction counter and the value Cs of the secondary-scanning-direction counter corresponding to the current primary-scanning-directional target pixel position (in Step S21).

Subsequently, the projection image generating unit 3 determines whether the target pixel is an end pixel in the primary scanning direction or not (in Step S22); and if the target pixel is not an end pixel in the primary scanning direction, then returning to Step S13, the projection image generating unit 3 selects a next primary-scanning-directional target pixel position and performs the same process for a next target pixel.

Otherwise, if the target pixel is an end pixel in the primary scanning direction, then the projection image generating unit 3 determines whether the value Cp of the primary-scanning-direction count is equal to or larger than the predetermined threshold value Th or not (in Step S23); and if the value Cp of the primary-scanning-direction count is equal to or larger than the predetermined threshold value Th then the projection image generating unit 3 projects a run onto the secondary-scanning-directional-projection image as well as in Step S20 (in Step S24). Here if the value Cp of the primary-scanning-direction count is less than the predetermined threshold value Th then the run is not projected.

Subsequently, the projection image generating unit 3 resets the value Cp of the primary-scanning-direction counter to zero (in Step S25), and resets the primary-scanning-directional target pixel position to the top (in Step S26).

Subsequently, the projection image generating unit 3 determines whether the target pixel is an end pixel in the secondary scanning direction (i.e. the last pixel of the input image) or not (in Step S27); and if the target pixel is not an end pixel in the secondary scanning direction, then returning to Step S12, the projection image generating unit 3 selects a next secondary-scanning-directional target pixel position and performs the same process for a next target pixel.

Otherwise, if the target pixel is an end pixel in the secondary scanning direction, then the projection image generating unit 3 selects the primary-scanning-directional target pixel position in order along the primary scanning direction from the top (in Step S28), and determines whether the value Cs of the secondary-scanning-direction counter corresponding to the current primary-scanning-directional target pixel position is equal to or larger than the predetermined threshold value Th or not (in Step S29); and if the value Cs of the secondary-scanning-direction counter is equal to or larger than the predetermined threshold value Th then the projection image generating unit 3 projects a run onto the primary-scanning-dimensional-projection image as well as in Step S18 (in Step S30).

Subsequently, the projection image generating unit 3 determines whether the target pixel is an end pixel in the primary scanning direction or not (in Step S31); and if the target pixel is not an end pixel in the primary scanning direction, then returning to Step S28, the projection image generating unit 3 selects a next primary-scanning-directional target pixel position and performs the same process for a next target pixel. Otherwise, if the target pixel is an end pixel in the primary scanning direction, then the projection image generating unit 3 terminates the projection image generation process (in Step S4).

Returning to FIG. 2, after the projection image generation process (in Step S4) is terminated, as mentioned, the blank sheet determining unit 4 subsequently determines that the document is a blank document on the basis of the number of runs in the primary-scanning-directional-projection image, the number of runs in the secondary-scanning-directional-projection image, and the like (in Step S5).

Figure 5:
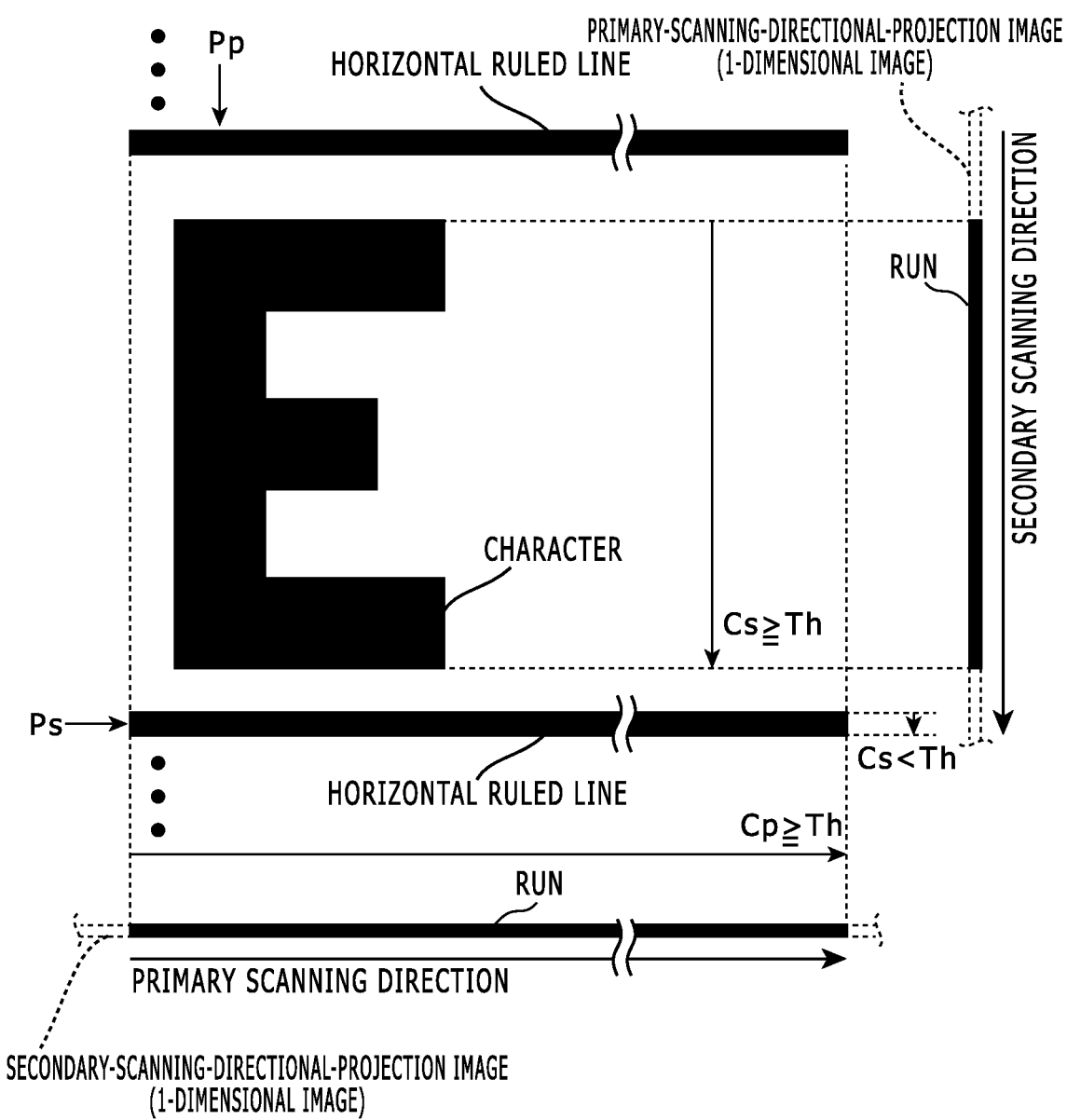
FIG. 5 shows a diagram that indicates an example of a primary-scanning-directional-projection image and a secondary-scanning-directional-projection image when an input image includes a character object.
Figure 6:
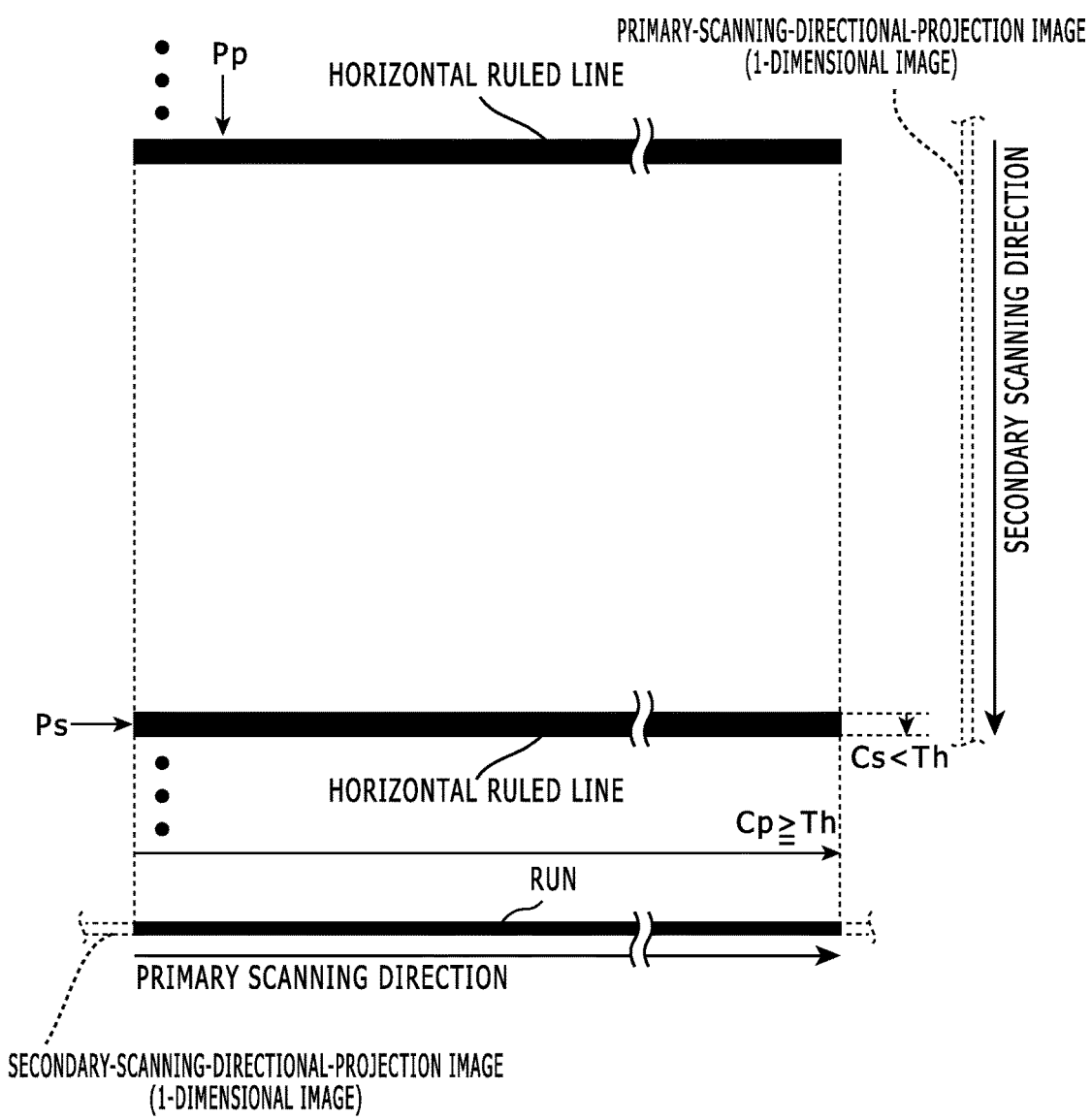
FIG. 6 shows a diagram that indicates an example of a primary-scanning-directional-projection image and a secondary-scanning-directional-projection image when an input image does not slant and the input image includes no character objects.
Figure 7:
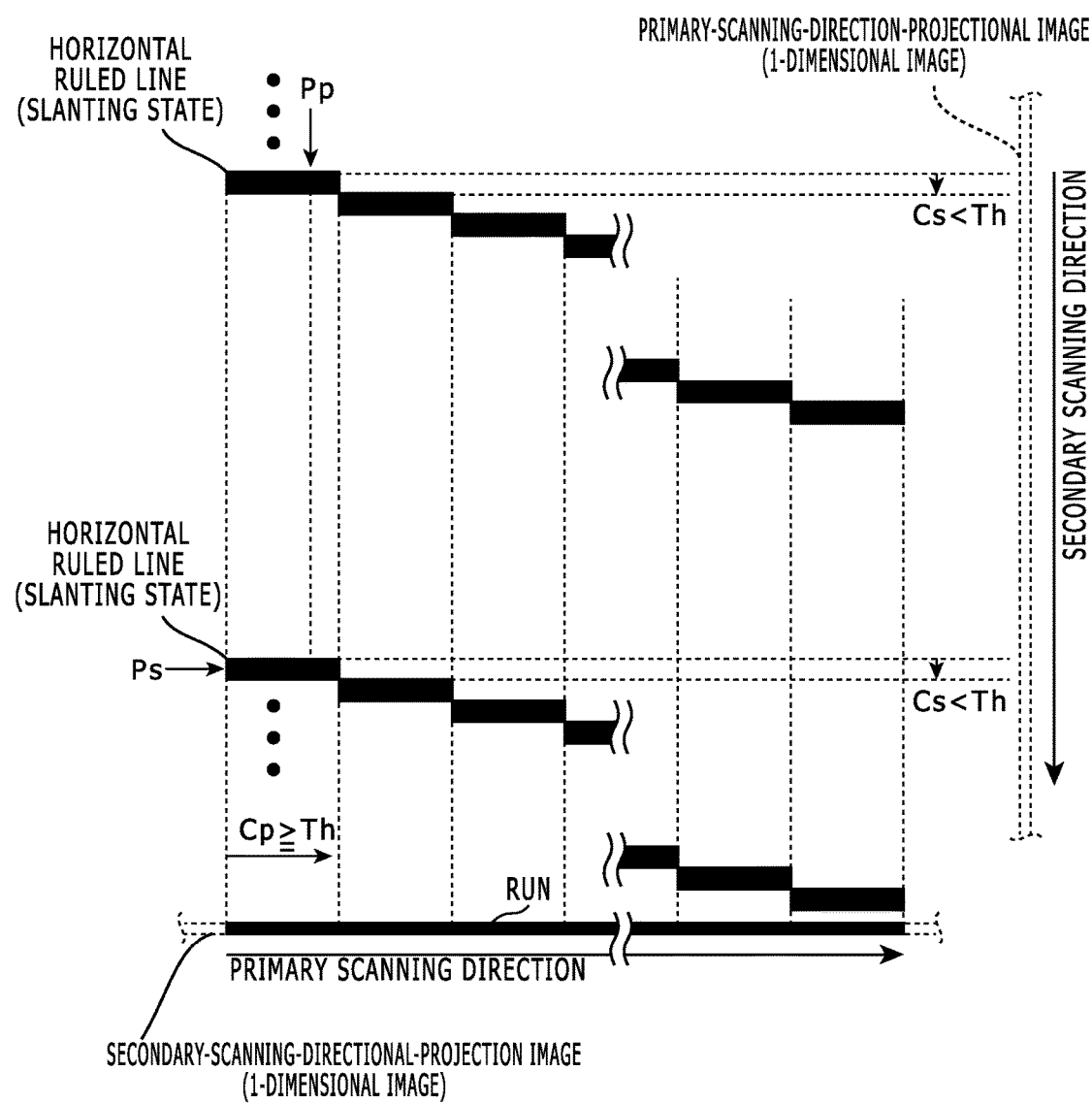
FIG. 7 shows a diagram that indicates an example of a primary-scanning-directional-projection image and a secondary-scanning-directional-projection image when an input image slants and the input image includes no character objects.

FIG. 5 shows a diagram that indicates an example of a primary-scanning-directional-projection image and a secondary-scanning-directional-projection image when an input image includes a character object. FIG. 6 shows a diagram that indicates an example of a primary-scanning-directional-projection image and a secondary-scanning-directional-projection image when an input image does not slant and the input image includes no character objects. FIG. 7 shows a diagram that indicates an example of a primary-scanning-directional-projection image and a secondary-scanning-directional-projection image when an input image slants and the input image includes no character objects.

For example, as shown in FIG. 5, if the input image includes a horizontal ruled line and a character object, then runs appear in both of the primary-scanning-directional-projection image and the secondary-scanning-directional-projection image, and consequently it is determined that the document is not a blank document.

For example, as shown in FIG. 6, if the input image includes only horizontal ruled lines, then a run appears in the secondary-scanning-directional-projection image but a run does not appear in the primary-scanning-directional-projection image, and consequently it is determined that the document is a blank document having a horizontal ruled line.

Further, for example, as shown in FIG. 7, if the input image includes only slanting horizontal ruled lines, then as well as in FIG. 6, a run appears in the secondary-scanning-directional-projection image but a run does not appear in the primary-scanning-directional-projection image, and consequently it is determined that the document is a blank document having a horizontal ruled line.

Afterward, a process in a subsequent stage (e.g. skipping printing of the blank sheet or the like) is performed on the basis of the determination result by the blank sheet determining unit 4.

As mentioned, in Embodiment 1, the image scanning unit 1 optically scans a document image of a document, and the preprocessing unit 2 generates an input image as a binary image from the document image. The projection image generating unit 3 (*a*) tries at each primary-scanning-directional target pixel position in the input image to detect a secondary-scanning-directional run that includes a predetermined number of continuous pixels or more along a secondary scanning direction, projects the detected secondary-scanning-directional run at the primary-scanning-directional target pixel position and thereby generates a one-dimensional primary-scanning-directional-projection image, and (b) tries at each secondary-scanning-directional target pixel position in the input image to detect a primary-scanning-directional run that includes a predetermined number of continuous pixels or more along the primary scanning direction, projects the detected primary-scanning-directional run at the secondary-scanning-directional target pixel position and thereby generates a one-dimensional secondary-scanning-directional-projection image. The blank sheet determining unit 4 determines that the document is a blank document at least on the basis of the number of runs in the primary-scanning-directional-projection image and the number of runs in the secondary-scanning-directional-projection image.

Consequently, even if a ruled line slants in the input image, it is properly determined whether an object (a character or the like) other than the ruled line exists or not.

Embodiment 2

In an image scanning apparatus of Embodiment 2, the blank sheet determining unit 4 (*a*) determines that document is a blank document that includes a horizontal ruled line if the primary-scanning-directional-projection image does not include a run having a predetermined length nor longer but the secondary-scanning-directional-projection image includes a run having the predetermined length or longer, and (b) determines that document is a blank document that includes a vertical ruled line if the secondary-scanning-directional-projection image does not include a run having the predetermined length nor longer but the primary-scanning-directional-projection image includes a run having the predetermined length or longer.

Here, for example, the "predetermined length" is set as a smallest value of a character size in the document. Consequently, a run smaller than the smallest character size due to dust or a stain is excluded in the determination of the blank document.

Further, in Embodiment 2, the blank sheet determining unit 4 may (a) determine that document is a blank document that includes a horizontal ruled line if the primary-scanning-directional-projection image does not include a predetermined number of runs nor more having a predetermined length nor longer but the secondary-scanning-directional-projection image includes the predetermined number of runs or more having the predetermined length or longer, and (b) determine that document is a blank document that includes a vertical ruled line if the secondary-scanning-directional-projection image does not include the predetermined number of runs nor more having the predetermined length nor longer but the primary-scanning-directional-projection image includes the predetermined number of runs or more having the predetermined length or longer. Here the "predetermined number" is equal to or larger than 1, and specified on the basis of setting data as well as in Embodiment 1.

Other parts of the configuration and the behavior of the image scanning apparatus in Embodiment 2 is identical or similar to that in Embodiment 1, and therefore, it is not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1, the blank sheet determining unit 4 may determine that the document is a blank document that includes no ruled lines if the aforementioned primary-scanning-directional-projection image includes no runs and the aforementioned secondary-scanning-directional-projection image includes no runs.

Further, in Embodiment 2, the blank sheet determining unit 4 may determine that the document is a blank document that includes no ruled lines if the aforementioned primary-scanning-directional-projection image does not include a run having a predetermined length nor longer and the aforementioned secondary-scanning-directional-projection image does not include a run having a predetermined length nor longer.

It should be noted that in Embodiments 1 and 2, the "blank document" means a document that includes no meaningful image object (a character, a figure, a photograph or the like) other than a ruled line, rather than a white document.

What is claimed is:

1. An image scanning apparatus, comprising:
   a processor; the processor capable of running software units;
   an image scanning unit configured to optically scan a document image of a document;
   a preprocessing unit, running on the processor, configured to generate an input image as a binary image from the document image;
   a projection image generating unit, running on the processor, configured to (a) try at each primary-scanning-directional target pixel position in the input image to detect a secondary-scanning-directional run that includes a predetermined number of continuous pixels or more along a secondary scanning direction, project the detected secondary-scanning-directional run at the primary-scanning-directional target pixel position and thereby generate a one-dimensional primary-scanning-directional-projection image, and (b) try at each secondary-scanning-directional target pixel position in the input image to detect a primary-scanning-directional run that includes a predetermined number of continuous pixels or more along the primary scanning direction, project the detected primary-scanning-directional run at the secondary-scanning-directional target pixel position and thereby generate a one-dimensional secondary-scanning-directional-projection image;
   a blank sheet determining unit, running on the processor, configured to determine that the document is a blank document at least on the basis of the number of runs in the primary-scanning-directional-projection image and the number of runs in the secondary-scanning-directional-projection image; wherein the blank sheet determining unit (a) determines that document is a blank document that includes a horizontal ruled line if the primary-scanning-directional-projection image does not include a predetermined number of runs nor more but the secondary-scanning-directional-projection image includes the predetermined number of runs or more, and (b) determines that document is a blank document that includes a vertical ruled line if the secondary-scanning-directional-projection image does not include the predetermined number of runs nor more but the primary-scanning-directional-projection image includes the predetermined number of runs or more; and
   the predetermined number is equal to or larger than 1, and specified on the basis of setting data.

2. An image scanning apparatus, comprising:
   a processor; the processor capable of running software units;
   an image scanning unit configured to optically scan a document image of a document;
   a preprocessing unit, running on the processor, configured to generate an input image as a binary image from the document image;
   a projection image generating unit, running on the processor, configured to (a) try at each primary-scanning-directional target pixel position in the input image to detect a secondary-scanning-directional run that includes a predetermined number of continuous pixels or more along a secondary scanning direction, project the detected secondary-scanning-directional run at the primary-scanning-directional target pixel position and thereby generate a one-dimensional primary-scanning-directional-projection image, and (b) try at each secondary-scanning-directional target pixel position in the input image to detect a primary-scanning-directional run that includes a predetermined number of continuous pixels or more along the primary scanning direction, project the detected primary-scanning-directional run at the secondary-scanning-directional target pixel position and thereby generate a one-dimensional secondary-scanning-directional-projection image;
   a blank sheet determining unit, running on the processor, configured to determine that the document is a blank document at least on the basis of the number of runs in the primary-scanning-directional-projection image and the number of runs in the secondary-scanning-directional-projection image; wherein the blank sheet determining unit (a) determines that document is a blank document that includes a horizontal ruled line if the primary-scanning-directional-projection image does not include a run having a predetermined length nor longer but the secondary-scanning-directional-projection image includes a run having the predetermined length or longer, and (b) determines that document is a blank document that includes a vertical ruled line if the secondary-scanning-directional-projection image does not include a run having the predetermined length nor longer but the primary-scanning-directional-projection image includes a run having the predetermined length or longer.

3. The image scanning apparatus according to claim 2, wherein the predetermined length is set as a smallest value of a character size in the document.

4. The image scanning apparatus according to claim 2, wherein the blank sheet determining unit (a) determines that document is a blank document that includes a horizontal ruled line if the primary-scanning-directional-projection image does not include a predetermined number of runs nor more having a predetermined length nor longer but the secondary-scanning-directional-projection image includes the predetermined number of runs or more having the predetermined length or longer, and (b) determines that document is a blank document that includes a vertical ruled line if the secondary-scanning-directional-projection image does not include the predetermined number of runs nor more having the predetermined length nor longer but the primary-scanning-directional-projection image includes the predetermined number of runs or more having the predetermined length or longer; and
   the predetermined number is equal to or larger than 1, and specified on the basis of setting data.

5. The image scanning apparatus according to claim 1, wherein the predetermined number of pixels is set as an uppermost value of a thickness of a ruled line in the document.

\* \* \* \* \*